C. F. DENNY.
REEL FOR EYEGLASS CHAINS.
APPLICATION FILED MAY 17, 1920.

1,376,262.

Patented Apr. 26, 1921.
2 SHEETS—SHEET 1.

WITNESSES
R. C. Thomas

C. F. Denny  INVENTOR
BY Victor J. Evans
ATTORNEY

C. F. DENNY.
REEL FOR EYEGLASS CHAINS.
APPLICATION FILED MAY 17, 1920.
1,376,262.
Patented Apr. 26, 1921.
2 SHEETS—SHEET 2.
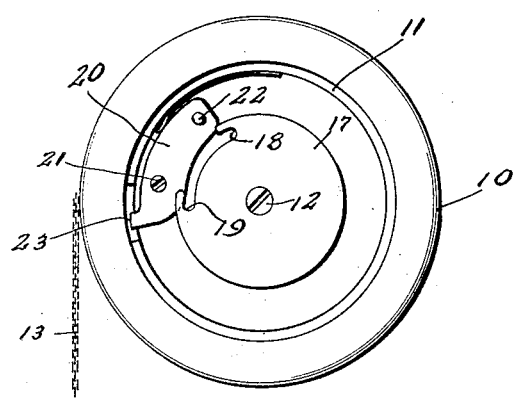
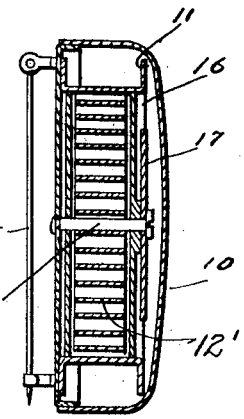
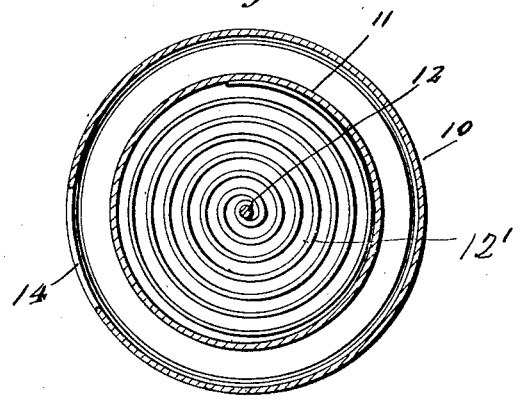
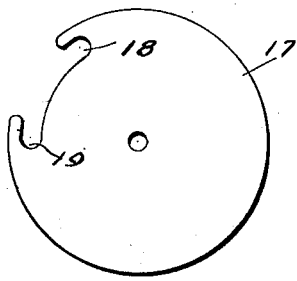
C. F. Denny INVENTOR

UNITED STATES PATENT OFFICE.

COLUMBUS F. DENNY, OF WILSON, NORTH CAROLINA.

REEL FOR EYEGLASS-CHAINS.

1,376,262.  Specification of Letters Patent.  Patented Apr. 26, 1921.

Application filed May 17, 1920. Serial No. 382,094.

*To all whom it may concern:*

Be it known that I, COLUMBUS F. DENNY, a citizen of the United States, residing at Wilson, in the county of Wilson and State of North Carolina, have invented new and useful Improvements in Reels for Eyeglass-Chains, of which the following is a specification.

This invention relates to improvements in reels for eye glass chains and has for an object the provision of a reel of simple construction, and attractive appearance which will maintain the chain in a wound or unwound condition as desired.

Another object of the invention is the provision of a spring actuated reel in which the latter will be automatically locked against unwinding movement when the chain has reached its unwinding limit, so as to prevent breaking either the spring of the reel or the chain.

A further object of the invention is the provision of a reel of the above character having a novel form of reel locking and releasing means, which is entirely controlled by the position of the eye glass chain.

Other objects and advantages of the invention will appear as the following description is read in connection with the accompanying drawings:

In the drawings:

Fig. 5 is a similar view with the parts released and in position for rewinding the chain.

Fig. 6 is a transverse sectional view.

Fig. 7 is a detail perspective view of the locking dog.

Fig. 8 is a section taken at right angles to Fig. 6, and showing the spring and chain reel.

Fig. 9 is a view of the cam locking disk.

Figure 1:
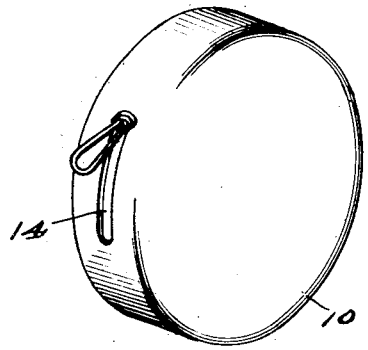
Figure 1 is a perspective view of a reel embodying the present invention.

Referring in detail to the drawings, wherein like characters of reference denote corresponding parts, the numeral 10 indicates a casing, which is preferably circular in form and which provides a housing for a spring actuated reel, locking means therefor and a chain, which is adapted to be wound upon and unwound from the said reel, all of which will be hereinafter explained.

The reel, which is indicated at 11, is rotatably mounted upon a stationary arbor 12 and which is suitably secured within the casing. The reel 11 is rotated in one direction under the influence of the spring 12′ and when so rotated will wind thereon a chain 13 which passes through an opening 14 provided in the casing and is designed to be secured to a pair of eye glasses or other appropriate article. The casing 10 is provided with a pin 15, by means of which it might be secured to an article of wearing apparel, as is usual in devices of this character. The outer surface of the reel is preferably provided with a depression 16 and mounted within this depression and spaced from the reel and fast upon the arbor 12, is a disk 17. This disk is provided with oppositely disposed notches 18 and 19, which notches are adapted to be engaged by a locking dog 20.

Figure 2:
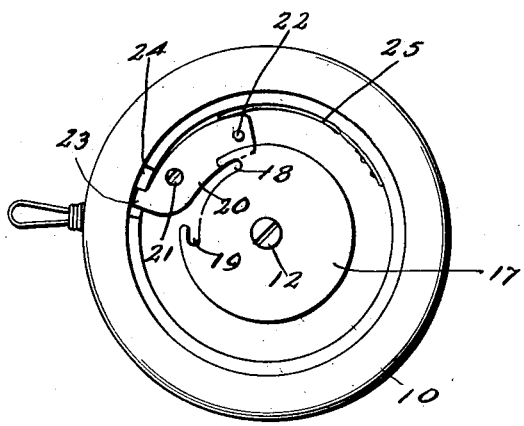
Fig. 2 is an enlarged sectional view through the casing showing the parts in normal position.

The dog 20 is pivotally mounted as at 21 upon the reel 11 and one end of this dog is provided with a laterally extending pin 22 for engagement with either the notch 18 or 19, while the opposite end of the dog is provided with a laterally and oppositely extending release arm 23. The arm 23 extends through an opening 24 provided in the adjacent face of the reel 11 and is disposed transversely of the reel, the arrangement being such that when the chain is wound upon the reel, the arm 23 will be disposed beneath the chain so that the latter will hold the pin 22 from engagement with either of the notches 18 or 19, as illustrated in Fig. 2 of the drawing.

Figure 3:
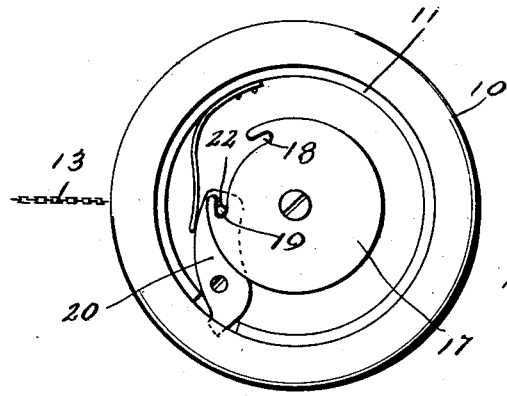
Fig. 3 is a similar view showing the position of the parts when the chain has been fully withdrawn and prior to locking the reel.
Figure 4:
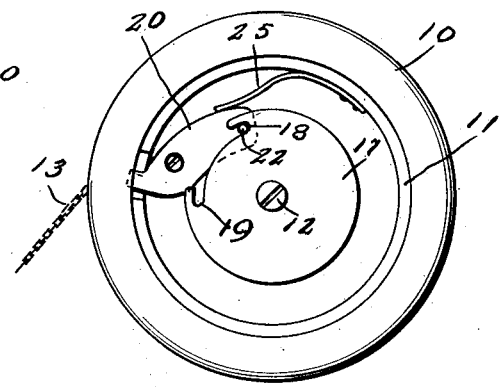
Fig. 4 is a like view with the parts locked.

In unwinding the chain, the latter is pulled outwardly in the direction shown in Fig. 3 and when the chain has been fully withdrawn, the dog 20 will be released. When this occurs, the pin 22 will engage the notch 19, due to this end of the dog having been forced inwardly in a direction toward the arbor 12 by a spring 25 as illustrated in Fig. 3 of the drawings. This holds the reel against further rotary movement in an unwinding direction, so that damage to the spring by being too tightly wound, is prevented. When tension upon the chain is released, a reverse movement of the reel will occur under the influence of the spring 12′, whereupon the pin 22 will engage the notch 18 and reel be held against further movement in this direction, as illustrated in Fig. 4 of the drawings. When it is desired to rewind the chain a slight pull in a downward direction, with the chain in the position illustrated in Fig. 5, will cause the reel to rotate slightly in an anti-clockwise direction, whereupon the pin 22 will be withdrawn from the notch 18 and the dog moved upon its pivot and when the tension of the chain is released, the latter will be rewound under the influence of the spring 12'.

The invention is susceptible of various changes in its form, proportions and minor details of construction, and the right is herein reserved to make such changes as properly fall within the scope of the appended claims.

Having described the invention what is claimed is:

1. An eye glass reel comprising a casing, a stationary arbor mounted thereon, a reel mounted for free rotation upon the arbor, a coiled spring connecting the reel and arbor for rotating the former in one direction, a stop secured to the arbor, a spring actuated dog engageable with the stop to prevent rotation of the reel in either direction and means engageable by the chain, whereby the dog may be operated to permit rotation of the reel.

2. An eye glass reel comprising a casing, a stationary arbor mounted thereon, a reel mounted for rotation upon the arbor, a coiled spring connecting the reel and arbor for rotating the former in one direction, a disk secured to the arbor, stops formed on said disk, a spring actuated dog carried by the reel and engageable with said stop to prevent rotation of the reel in either direction and means engageable with the chain, whereby the dog may be operated to permit rotation of the reel.

3. An eye glass reel comprising a casing, a stationary arbor mounted therein, a reel mounted for free rotation upon the arbor, a coiled spring connecting the reel and arbor for rotating the former in one direction, a notched disk secured to the arbor, a spring actuated dog engageable with the notched disk to prevent rotation of the reel in either direction and means engageable with the chain, whereby the dog may be operated to permit rotation of the reel.

4. An eye glass reel comprising a casing, a stationary arbor mounted therein, a reel mounted for free rotation upon the arbor, a coiled spring connecting the reel and arbor for rotating the former in one direction, a disk secured to the arbor, oppositely disposed peripheral locking notches formed in the disks, a spring actuated dog engageable with the locking notches to prevent rotation of the reel in either direction and means engageable by the chain whereby the dog may be operated to permit rotation of the reel.

5. An eye glass reel comprising a casing, a stationary arbor mounted therein, a reel mounted for free rotation upon the arbor, a coiled spring connecting the reel and arbor for rotating the former in one direction, a disk secured to the arbor and having oppositely disposed locking notches therein, a spring actuated dog secured to the reel, a laterally extending pin projecting from the dog for engagement with the locking notches to prevent rotation of the reel in either direction and means engageable by the chain, whereby the dog may be operated to permit rotation of the reel.

6. An eye glass reel comprising a casing, a stationary arbor therein, a reel mounted for free rotation upon the arbor, a coiled spring connecting the reel and arbor for rotating the former in one direction, a stop secured to the arbor, a spring actuated dog engageable with the stop to prevent rotation of the reel in either direction and an arm carried by the dog and extending transversely across the periphery of the reel for engagement by the chain, whereby the dog may be operated to permit rotation of the reel.

In testimony whereof I affix my signature.

COLUMBUS F. DENNY.